(12) United States Patent
Park

(10) Patent No.: US 7,848,774 B2
(45) Date of Patent: Dec. 7, 2010

(54) METHOD AND APPARATUS FOR SELECTING SERVICE PATH IN RELAY COMMUNICATION SYSTEM

(75) Inventor: Won-Hyoung Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 580 days.

(21) Appl. No.: 11/848,068

(22) Filed: Aug. 30, 2007

(65) Prior Publication Data

US 2008/0057973 A1 Mar. 6, 2008

(30) Foreign Application Priority Data

Aug. 30, 2006 (KR) .............. 2006-0082776

(51) Int. Cl.
*H04M 1/00* (2006.01)
(52) U.S. Cl. ............... 455/550.1; 455/67.13; 455/11.1; 370/315
(58) Field of Classification Search ............. 455/550.1, 455/11.1, 67.13; 370/315
See application file for complete search history.

(56) References Cited

U.S. PATENT DOCUMENTS

| | | | |
|---|---|---|---|
| 2001/0046873 A1* | 11/2001 | Komatsu | 455/506 |
| 2003/0069047 A1* | 4/2003 | Kitahara | 455/562 |
| 2003/0165127 A1* | 9/2003 | Fujiwara et al. | 370/335 |
| 2004/0023693 A1* | 2/2004 | Okawa et al. | 455/562.1 |
| 2004/0185780 A1 | 9/2004 | Coupechoux et al. | |
| 2004/0235472 A1* | 11/2004 | Fujishima et al. | 455/434 |
| 2004/0242154 A1 | 12/2004 | Takeda et al. | |
| 2005/0233752 A1* | 10/2005 | Laroia et al. | 455/450 |
| 2006/0077927 A1* | 4/2006 | Kilfoyle et al. | 370/328 |
| 2007/0223390 A1* | 9/2007 | Kobayashi et al. | 370/252 |

FOREIGN PATENT DOCUMENTS

| | | |
|---|---|---|
| JP | 10051374 | 2/1998 |
| JP | 2001292089 | 10/2001 |
| KR | 1020060132422 | 12/2006 |
| WO | WO 03/101132 | 12/2003 |

* cited by examiner

*Primary Examiner*—Danh C Le
(74) *Attorney, Agent, or Firm*—The Farrell Law Firm, LLP

(57) ABSTRACT

A method and apparatus for selecting a service path of a Mobile Station (MS) in a relay communication system. The method includes periodically transmitting, by a Base Station (BS), a preamble (or pilot) signal to the MS and Relay Stations (RSs) existing within a cell; measuring, by the RSs, a Signal-to-Interference and Noise Ratio (SINR) of a BS-RS link, and transmitting the measured SINR and the preamble (or pilot) signal to the MS; by the MS, measuring an SINR of each link using signals received from the BS and the RSs; and by the MS, computing throughput in consideration of the SINR of each link and frequency resources reused in the RSs existing within the cell, and selecting a service path having the highest throughput.

16 Claims, 17 Drawing Sheets

METHOD AND APPARATUS FOR SELECTING SERVICE PATH IN RELAY COMMUNICATION SYSTEM

PRIORITY

This application claims priority under 35 U.S.C. §119 to an application filed in the Korean Intellectual Property Office on Aug. 30, 2006 and assigned Serial No. 2006-0082776, the contents of which are incorporated herein by reference.

BACKGROUND OF THE INVENTION

1. Field of the Invention

The present invention generally relates to a method and apparatus for selecting a service path in a communication system, and in particular, to a method and apparatus for selecting a service path of a Mobile Station (MS) in consideration of frequency resources reused in a Relay Station (RS) existing within a cell.

2. Description of the Related Art

In a 4th Generation (4G) communication system, researches are being actively conducted to provide users with a variety of Quality of Services (QoSs) at a high data transfer rate of about 100 Mega bits per second (Mbps).

In particular, in a Broadband Wireless Access (BWA) communication system, such as a Local Area Network (LAN) system, a Metropolitan Area Network (MAN) system, etc., researches are being conducted so a high speed service can be supported while ensuring mobility and QoS. A typical example of such a communication system includes a BWA communication system conforming to the Institutes of Electrical and Electronics Engineers (IEEE) 802.16d standard or the IEEE 802.16e standard. However, when a Base Station (BS) is further included in a new system, a wired network may be newly installed, which leads to an additional cost. Therefore, a communication technique in which a Relay Station (RS) is installed between the BS and a Mobile Station (MS) is expected as a promising 4 G communication technique.

In a communication system using a RS, channel conditions may differ from one channel to another since separate channels are formed in a BS-RS link and a BS-MS link. As a result, throughput for a case when an MS directly communicates with a BS may be different from throughput for a case when an MS communicates with a BS via an RS. Accordingly, there is a need for a method for selecting a service path of an MS (i.e., MS-BS link or MS-RS link).

SUMMARY OF THE INVENTION

The present invention provides a method and apparatus for selecting a service path in a relay communication system.

The present invention also provides a method and apparatus for selecting a service path of an MS in consideration of a frequency reuse within a cell in a relay communication system.

According to a first aspect of the present invention, there is provided a method of selecting a service path of an MS in a relay communication system, the method including periodically transmitting, by a BS, a first preamble (or pilot) signal to the MS and RSs existing within a cell; by the RSs, measuring a SINR of a BS-RS link, and transmitting the measured SINR and a second preamble (or pilot) signal to the MS; measuring, by the MS, an SINR of each link using signals received from the BS and the RSs; and by the MS, computing throughput in consideration of the SINR of each link and frequency resources reused in the RSs existing within the cell, and selecting a service path having a highest throughput.

According to a second aspect of the present invention, there is provided a method of operating a BS for selecting a service path of an MS in a relay communication system, the method including periodically transmitting a preamble (or pilot) signal to the MS and RSs within a cell; and receiving, from the MS, information on a service path selected in consideration of frequency reuse.

According to a third aspect of the present invention, there is provided a method of operating an RS for selecting a service path of an MS in a relay communication system, the method including measuring a SINR of a BS-RS link by using a first preamble (or pilot) signal received from a BS; periodically transmitting the measured SINR and a second preamble (or pilot) signal to the MS; and receiving, from the MS, information on a service path selected in consideration of frequency reuse.

According to a fourth aspect of the present invention, there is provided a method of operating an MS for selecting a service path in a relay communication system, the method including measuring a SINR of each link by receiving a preamble (or pilot) signal from a BS and RSs; computing throughput for a case when a service is received from the BS by using the measured SINR of each link; computing throughput for a case when the service is received via each RS in consideration of the measured SINR of each link and frequency resources reused in the RSs existing within a cell; and selecting a service path having a highest throughput by comparing the computed throughputs of the respective service paths.

According to a fifth aspect of the present invention, there is provided a BS apparatus of a relay communication system, the BS apparatus including a preamble generator for periodically generating a preamble (or pilot) signal; a transceiver for transmitting the generated preamble (or pilot) signal to an MS or RS existing within a cell and for receiving service path information from the MS; and a path checking unit for checking a service path of the MS by using the received service path information in consideration of frequency reuse.

According to a sixth aspect of the present invention, there is provided an RS apparatus of a relay communication system, the RS apparatus including a preamble generator for periodically generating a preamble (or pilot) signal; a transceiver for receiving a preamble (or pilot) signal of a BS, transmitting the generated preamble (or pilot) signal to an MS, and receiving service path information from the MS; a channel information checking unit for measuring a SINR of a BS-RS link by using the preamble (or pilot) signal of the BS; and a path checking unit for checking a service path of an MS by using the service path information received from the MS in consideration of frequency reuse.

According to a seventh aspect of the present invention, there is provided an MS apparatus for selecting a service path in a relay communication system, the MS apparatus including a transceiver for transmitting/receiving signals to/from a BS and RSs; a channel information checking unit for measuring a SINR of each link by using the signals received from the BS and the RSs; a throughput measuring unit for computing throughput for a case when a service is received from the BS by using the measured SINR of each link and throughput for a case when the service is received via each RS in consideration of frequency reuse within a cell; and a path selector for selecting a service path having a highest throughput by comparing the computed throughputs of the service paths.

According to an eighth aspect of the present invention, there is provided a method of selecting a service path of an MS in a relay communication system, the method including periodically transmitting, by a BS, a first preamble (or pilot) signal to the MS and RSs existing within a cell; periodically transmitting, by the RSs, a second preamble (or pilot) to the MS, measuring, by the RSs, a SINR of a BS-RS link, and transmitting, by the RSs, the measured SINR to the BS; measuring, by the MS, an SINR of a BS-MS link and an SINR of an RS-MS link by using the signals received from the BS and the RSs, and transmitting the measured SINRs to the BS; and by the BS, computing throughput depending on each service path in consideration of the SINR of each link and frequency resources reused in the RSs existing within a cell, and selecting a service path having a highest throughput.

According to a ninth aspect of the present invention, there is provided a method of operating a BS for selecting a service path of an MS in a relay communication system, the method including periodically transmitting a preamble (or pilot) signal to the MS and RSs existing within a cell; receiving a SINR of each link from the MS and the RSs; computing throughputs depending on service paths in consideration of the received SINR of each link and frequency resources reused in the RSs existing within the cell; and selecting a service path having a highest throughput from among the computed throughputs of the service paths.

According to a tenth aspect of the present invention, there is provided a method of operating an RS for selecting a service path of an MS in a relay communication system, the method including measuring an SINR of a BS-RS link by using a first preamble (or pilot) signal received from a BS; transmitting the measured SINR to the BS, and periodically transmitting a second preamble (or pilot) signal to the MS; and receiving, from the BS, information on a service path selected in consideration of frequency reuse.

According to an eleventh aspect of the present invention, there is provided a method performed by an MS for selecting a service path in a relay communication system, the method including receiving a preamble (or pilot) signal from a BS and RSs, and measuring a SINR of a BS-MS link and an SINR of an RS-MS link; transmitting the measured SINR of each link to the BS; and receiving, from the BS, information on a service path selected in consideration of frequency reuse.

According to a twelfth aspect of the present invention, there is provided a BS apparatus for selecting a service path of an MS in a relay communication system, the BS apparatus including a preamble generator for periodically generating a preamble (or pilot) signal; a transceiver for transmitting the generated preamble (or pilot) to the MS and RSs existing within a cell and for receiving a SINR of each link from the MS and the RSs; a throughput measuring unit for computing throughput for a case when a service is provided directly from the BS by using the received SINR of each link and for computing throughput for a case when the service is provided via each RS in consideration of frequency reuse within a cell; and a path selector for selecting a service path having a highest throughput by comparing the computed throughputs of the service paths.

According to a thirteenth aspect of the present invention, there is provided an RS apparatus of a relay communication system, the RS apparatus including a preamble generator for periodically generating a first preamble (or pilot) signal; a transceiver for receiving a second preamble (or pilot) signal of a BS, transmitting the generated first preamble (or pilot) signal to an MS, and transmitting a SINR to the BS; a channel information checking unit for measuring a an SINR of a BS-RS link by using the second preamble (or pilot) signal of the BS; and a path checking unit for checking a service path of the MS by receiving, from the BS, information on the service path selected in consideration of frequency reuse.

According to a fourteenth aspect of the present invention, there is provided an MS apparatus of a relay communication system, the MS apparatus including a channel information checking unit for measuring a SINR of each link by using preamble signals received from a BS and RSs; a transceiver for receiving the preamble (or pilot) signals from the BS and the RSs and for transmitting the measured SINR to the BS; and a path checking unit for checking a service path of the MS by receiving, from the BS, information on the service path selected in consideration of frequency reuse.

BRIEF DESCRIPTION OF THE DRAWINGS

The above and other aspects, features and advantages of the present invention will become more apparent from the following description when taken in conjunction with the accompanying drawings in which.

DETAILED DESCRIPTION OF THE PREFERRED EMBODIMENTS

Preferred embodiments of the present invention will be described below with reference to the accompanying drawings. In the following description, well-known functions or constructions are not described in detail since they would obscure the invention in unnecessary detail.

A method and apparatus of the present invention will be described hereinafter in which throughput is computed in consideration of frequency resources reused by a Relay Station (RS) within a cell of a relay communication system, and a service path of a Mobile Station (MS) is selected using the computation result.

Figure 1:
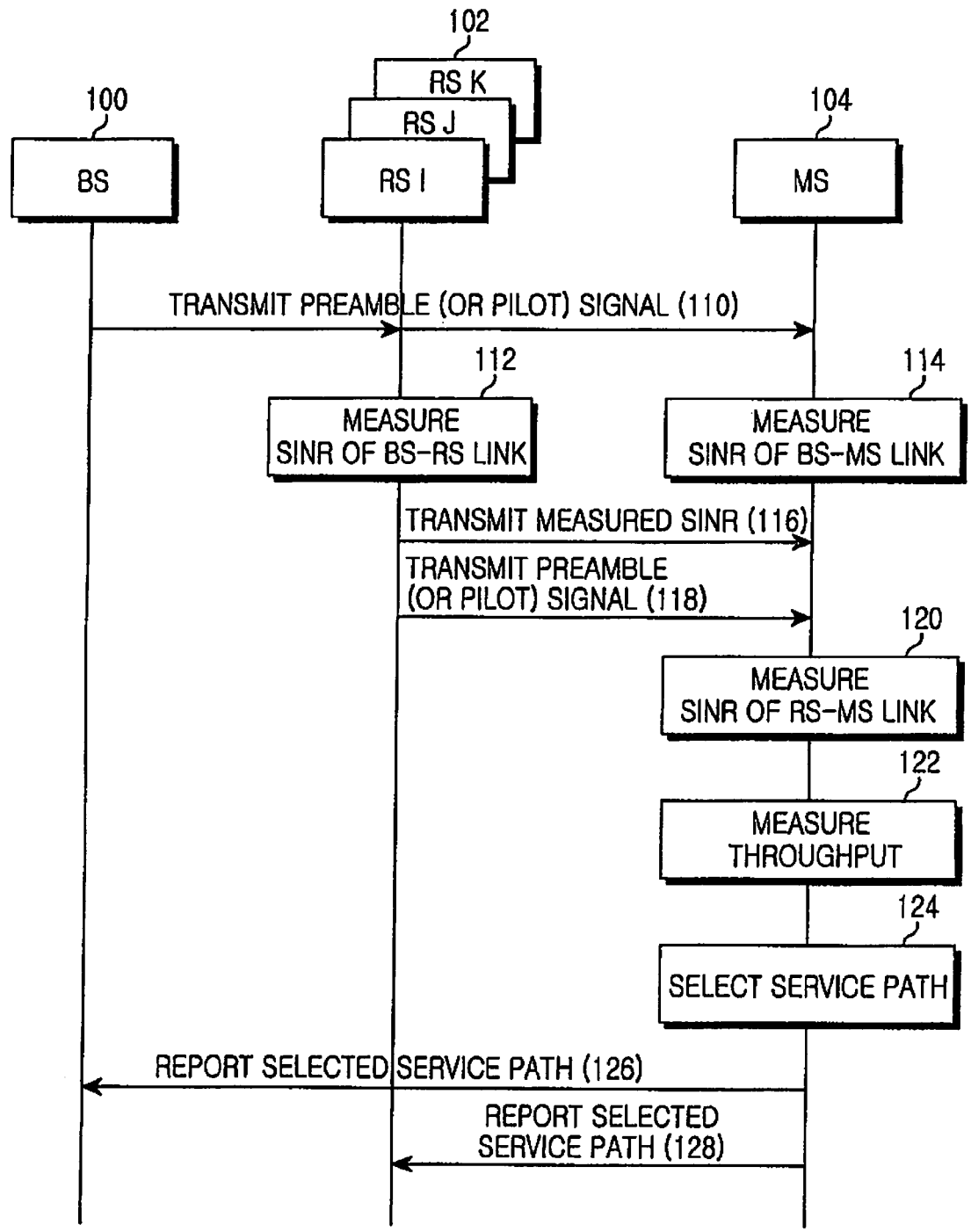
FIG. 1 is a signal flow diagram when a Mobile Station (MS) selects a service path in a relay communication system according to the present invention.

FIG. 1 shows a signal flow diagram when an MS selects a service path in a relay communication system according to the present invention.

In FIG. 1, in step 110, a BS 100 transmits a preamble (or pilot) signal within a particular time interval so that an MS 104 and a plurality of RSs 102 existing within a cell can measure a channel condition.

In step 112, each RS 102 measures a Signal-to-Interference and Noise Ratio (SINR) of a BS-RS link by using the preamble (or pilot) signal received from the BS 100. Then, in step 114, the MS 104 measures an SINR of a BS-MS link by using the preamble (or pilot) signal received from the BS 100.

In step 116, each RS 102 transmits to the MS 104 the measured SINR of BS-RS link. In step 118, each RS 102 generates a preamble (or pilot) signal and transmits the signal to the MS 104. The preamble (or pilot) signal transmitted from each RS 102 is transmitted within a time interval. In step 116, the SINR of the BS-RS link may be transmitted together with the preamble (or pilot) signal.

In step 120, the MS 104 measures an SINR of an RS-MS link by using a preamble (or pilot) signal received from a RS 102. In step 122, by using the SINRs measured and received as described above, the MS 104 computes throughput for a case when a service is directly received from the BS 100 and throughput for a case when the service is received via an RS 102. The throughput for a case when the service is received via an RS 102 may be computed in consideration of frequency resources reused in the RSs 102 existing within the cell.

In step 124, the MS 104 compares the computed throughputs, and selects a service path having a highest throughput. In step 126, the MS 104 reports the selected service path to the BS 100. If one of the RSs 102 is selected as the service path, in step 128, the MS 104 reports to the selected RS 102 the fact that the RS 102 has been selected as the service path of the MS 104.

Figure 2:
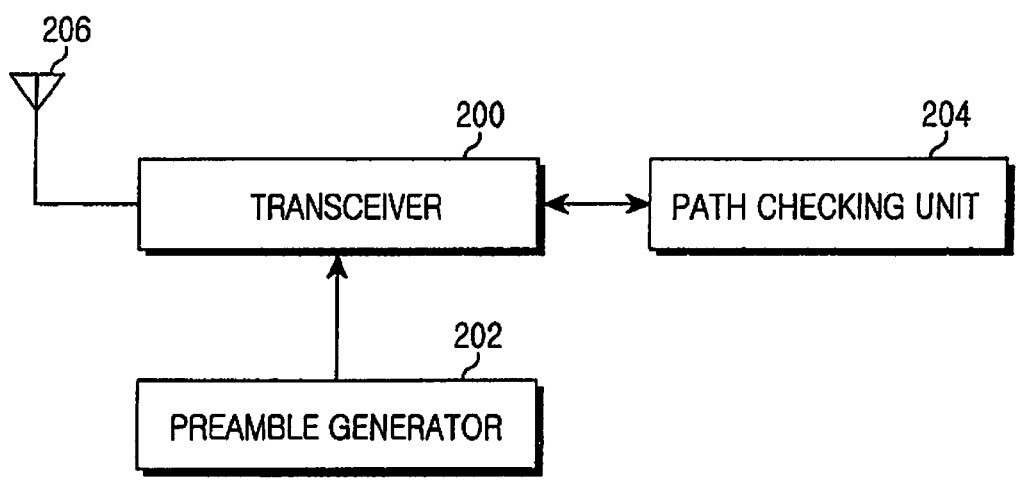
FIG. 2 is a block diagram of a Base Station (BS) when an MS selects a service path in a relay communication system according to the present invention.

FIG. 2 shows a BS when an MS selects a service path in a relay communication system according to the present invention. The BS includes a transceiver 200, a preamble generator 202, a path checking unit 204, and an antenna 206.

Referring to FIG. 2, the transceiver 200 transmits and receives a Radio Frequency (RF) signal through the antenna 206. In particular, the transceiver 200 transmits a preamble (or pilot) signal, input from the preamble generator 202, to the MS and RSs existing within a cell, and transmits to the path checking unit 204 service path information received from the MS.

The preamble generator 202 generates the preamble (or pilot) signal within a particular time interval, and transmits the generated signal to the transceiver 200.

The path checking unit 204 receives the service path information from the transceiver 200, checks the service path, and performs a function for communication with the MS.

Figure 3:
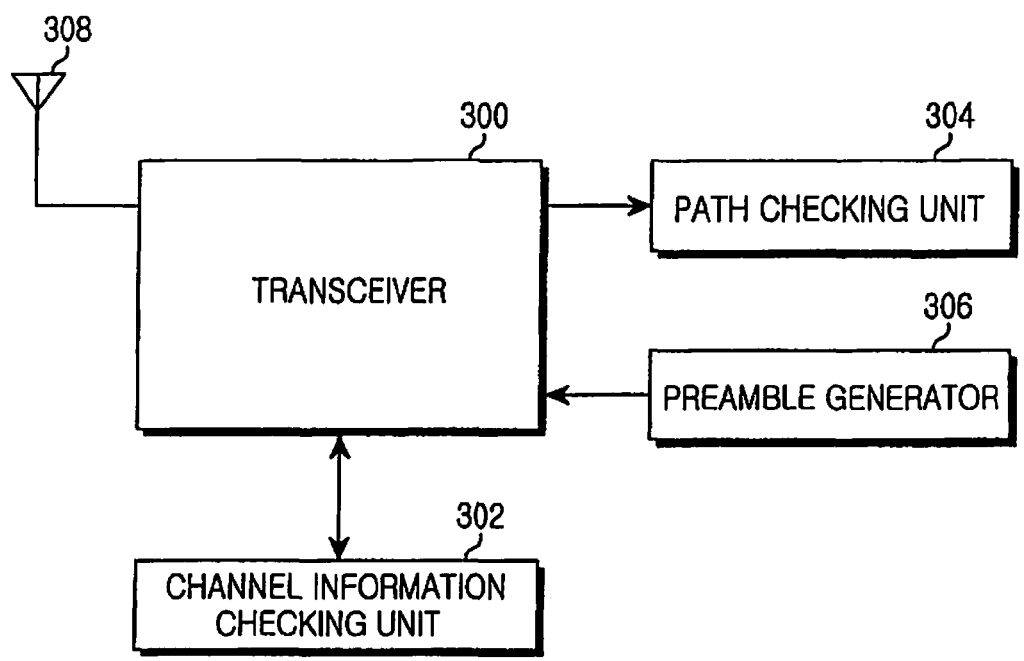
FIG. 3 is a block diagram of a Relay Station (RS) when an MS selects a service path in a relay communication system according to the present invention.

FIG. 3 shows an RS when an MS selects a service path in a relay communication system according to the present invention. The RS includes a transceiver 300, a channel information checking unit 302, a path checking unit 304, a preamble generator 306, and an antenna 308.

Referring to FIG. 3, the transceiver 300 transmits and receives an RF signal through the antenna 308. In particular, the transceiver 300 transmits a preamble (or pilot) signal, input from the preamble generator 306, to the MS and RSs existing within a cell, outputs the preamble (or pilot) signal received from the BS to the channel information checking unit 302, and outputs service path information received from the MS to the path checking unit 304.

The channel information checking unit 302 obtains, from the received preamble (or pilot) signal, channel information regarding the BS and then measures an SINR of a BS-RS link.

The path checking unit 304 checks, for the service path information received from the transceiver 300, whether the RS is selected as the service path of the MS, and then performs a function for data communication with the MS.

The preamble generator 306 generates a preamble (or pilot) signal within a particular time interval, and outputs the signal to the transceiver 300.

Figure 4:
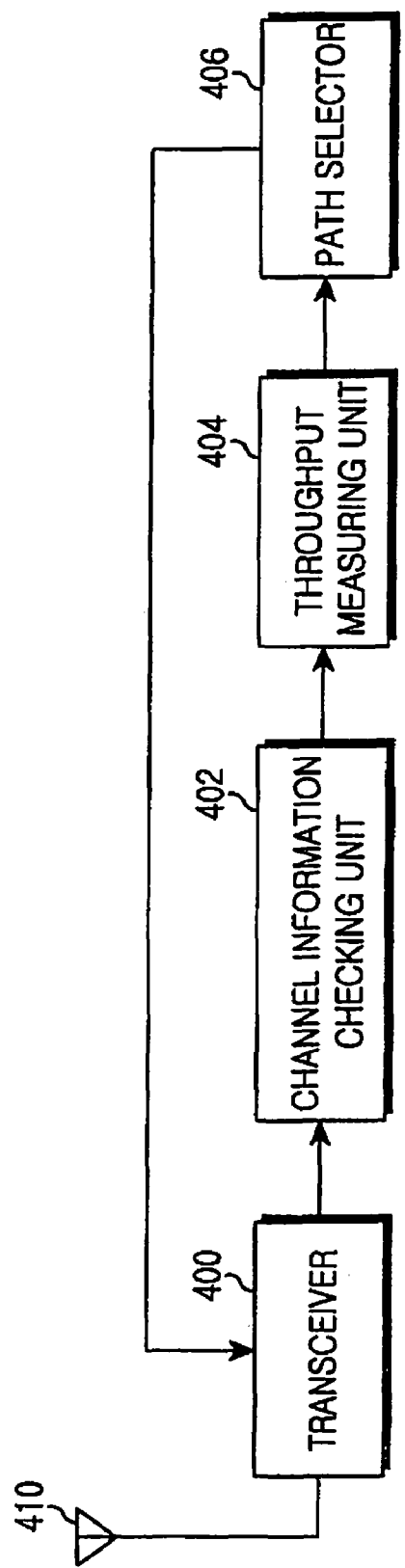
FIG. 4 is a block diagram of an MS selecting a service path in a relay communication system according to the present invention.

FIG. 4 shows an MS selecting a service path in a relay communication system according to the present invention. The MS includes a transceiver 400, a channel information checking unit 402, a throughput measuring unit 404, a path selector 406, and an antenna 410.

Referring to FIG. 4, the transceiver 400 transmits and receives an RF signal through the antenna 410. In particular, the transceiver 400 outputs a preamble (or pilot) signal received from a BS and RSs and an SINR of a BS-RS link to the channel information checking unit 402, and transmits to the BS and a corresponding RS the selected service path information input from the path selector 406.

By the use of the received preamble (or pilot) signal, the channel information checking unit 402 obtains channel information regarding the BS and channel information regarding the RSs existing within the cell. Thus, the channel information checking unit 402 measures an SINR of a BS-MS link and an SINR of an RS-MS, and outputs the measured SINRs to the throughput measuring unit 404. Furthermore, the channel information checking unit 402 outputs the SINR of the BS-RS link, received from the transceiver 400, to the throughput measuring unit 404.

The throughput measuring unit 404 receives the SINR of the BS-RS link, the SINR of the BS-MS link, and the SINR of the RS-MS link from the channel information checking unit 402, and computes throughput depending on the service path of the MS by using the SINRs of the respective links. In other words, the throughput in a case when the MS receives a service directly from the BS and the throughput in a case when the MS receives the service via an RS are computed using the following Equations (1) and (2).

Equation (1) below represents throughput when the MS directly receives the service from the BS, the throughput being denoted as $SEP_{dir}$, where SEP is Spectral Efficiency Path.

$$SEP_{dir} = C_{BM} = C(SINR_{BM}) \quad (1)$$

C denotes an SINR function for channel throughput, $SINR_{BM}$ denotes an SINR value of a BS-MS link, and $C_{BM}$ denotes throughput of the BS-MS link.

Equation (2) below represents throughput when the MS receives the service via an RS, the throughput being denoted as $SEP_{re}$, where SEP is Spectral Efficiency Path.

$$SEP_{re} = \left(\frac{1}{C_{BR}} + \frac{1}{C_{MR}}\right)^{-1} \quad (2)$$

$C_{BR}$ denotes throughput of a BS-RS link, and $C_{MR}$ denotes throughput of an MS-RS link.

Figure 15:
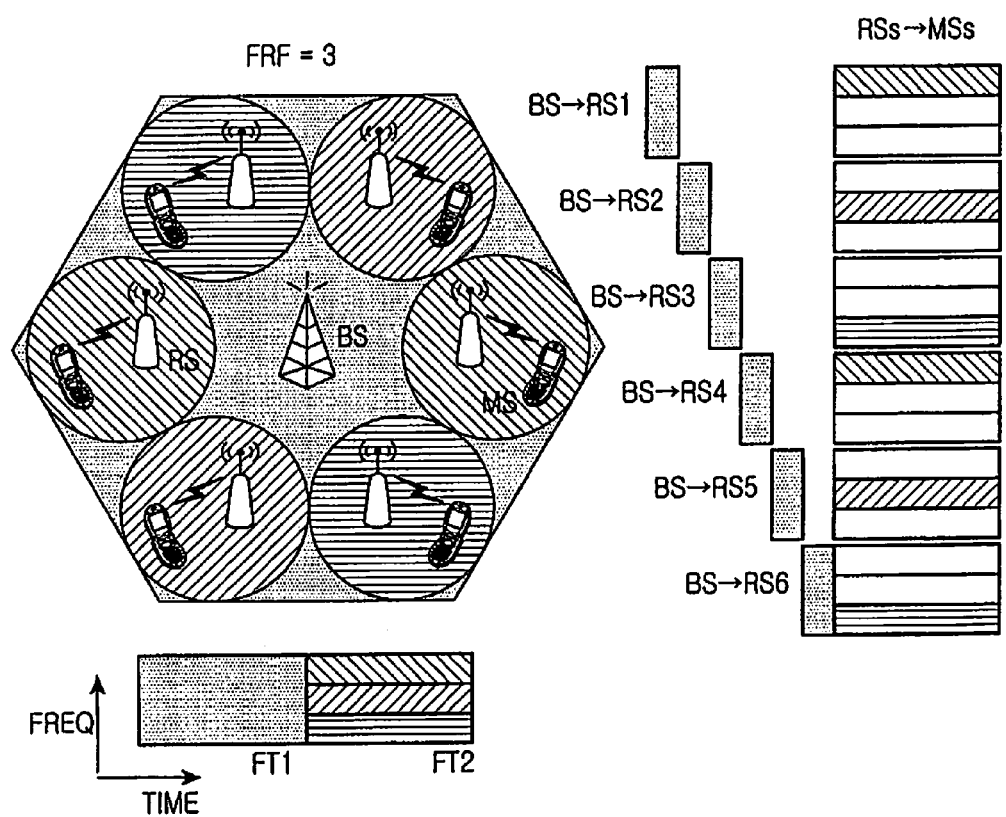
FIG. 15 is a view for illustrating a frame when a signal is transmitted between a BS and RSs in a relay communication system according to the present invention.
Figure 16:
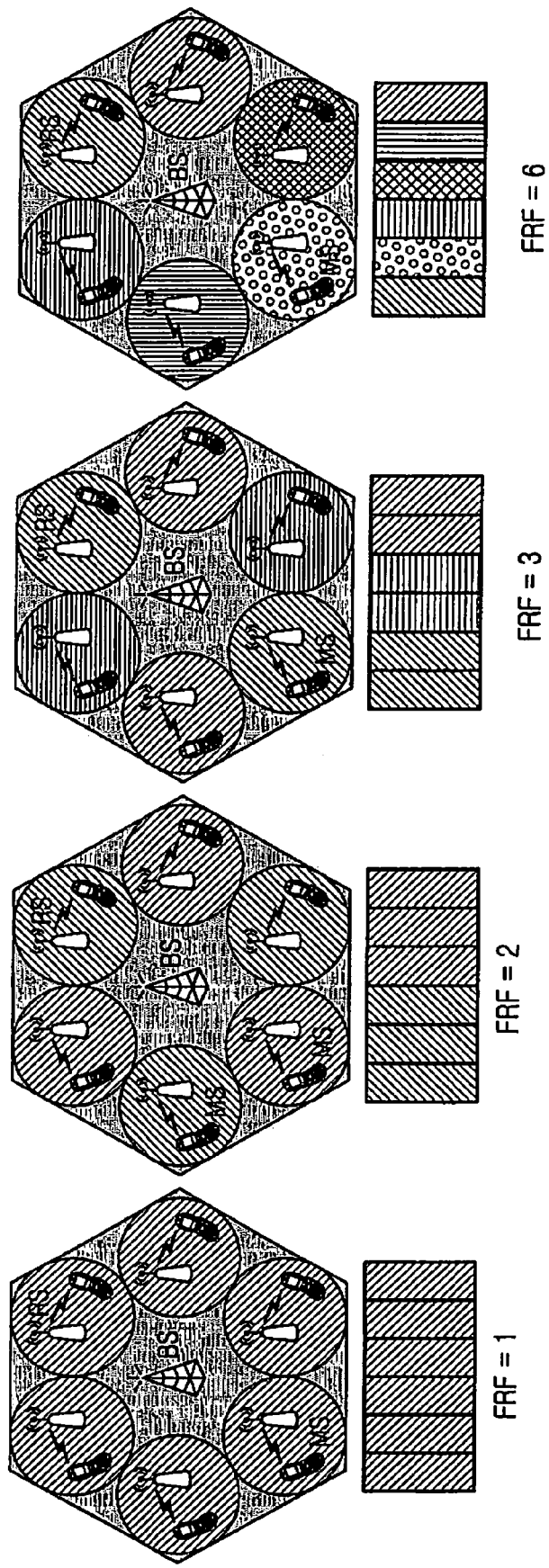
FIG. 16 is a view for illustrating frequency resources reused by RSs in a relay communication system according to the present invention.

Referring to FIG. 15, assuming that the number of RSs existing within a cell is N, and frequency resources are reused by the RSs, then, when throughput is computed for a case when a service is received via the RSs, the throughput measuring unit 404 may compute the throughput in consideration of the frequency reuse. In this case, in order to define a frequency reuse pattern used by the RSs, a frame is divided into a Frame Type 1 (FT1) in which a signal is transmitted by a BS and a Frame Type 2 (FT2) in which a signal is transmitted by an RS, and the BS is assumed to not transmit a signal in a case of the FT2. Accordingly, in the FT2, a frequency resource may be repeatedly used up to N/FRF times according to a Frequency Reuse Factor (FRF), as shown in FIG. 16.

Therefore, the throughput measuring unit 404 may compute throughput depending on the frequency reuse as expressed by Equation (3) below in consideration of the fact that the same frequency resource is repeatedly used in the same frame according to the FRF used by the RSs.

Equation (3) below represents throughput depending on the frequency reuse when the MS receives the service via an RS, the throughput being denoted as $CSEP_{re}$, where CSEP is Cell Spectral Efficiency Path.

$$CSEP_{re} = \frac{nR_{MS}}{B_{nMS}} = \frac{nC_{BR}C_{MR}}{nC_{MR} + FRF \times C_{BR}} = \left(\frac{1}{C_{BR}} + \frac{FRF}{nC_{MR}}\right)^{-1} \quad (3)$$

In Equation (3), n denotes the number of RSs each associated with a different MS, and $R_{MS}$ denotes throughput for an MS when the MS receives a service via one RS. The throughput $R_{MS}$ is a product ($W_{BR} \times C_{BR}$) between an amount ($W_{BR} = C_{MR}/(C_{BR}+C_{MR})$) of resources consumed by a BS-RS link and throughput ($C_{BR} = C(SINR_{BR})$), or a product ($W_{MR} \times C_{MR}$) between an amount ($W_{MR} = C_{BR}/(C_{BR}+C_{MR})$) of resources consumed by an RS-MS link and throughput ($C_{MR} = C(SINR_{MR})$). Further, $B_{nMS}$ denotes the sum of all resources consumed, that is, the sum ($nW_{BR}+FRF \times C_{BR}$) between an amount ($nW_{BR}$) of all resources consumed by the BS-RS link and an amount ($FRF \times C_{BR}$) of all resources consumed by the RS-MS link.

The throughput computed using the frequency reuse as expressed by Equation (3) may be considered as an ideal computation result. The throughput may also be computed using a weighting factor as expressed by Equation (4) below.

$$CSEP_{re} = \left(\frac{1}{C_{BR}} + \frac{FRF}{anC_{MR}}\right)^{-1} \quad (4)$$

In Equation (4), $\alpha$ denotes a weighting factor where $0 < \alpha \leq 1$. Due to signal attenuation during wireless communication, the actual throughput has difficulty being n times higher than the number of RSs. Therefore, in practice, a weighting factor $\alpha$ is used for the value $nC_{MR}$.

The path selector 406 compares the throughputs measured by the throughput measuring unit 404, selects a service path having a highest throughput, and outputs information on the selected service path to the transceiver 400. In other words, when throughput ($SEP_{dir}$) for a case when a service is received directly from the BS is greater than or equal to throughput ($SEP_{re}$ or $CSEP_{re}$) for a case when a service is received via an RS, that is, $SEP_{dir} \geq SEP_{re}$ or $SEP_{dir} \geq CSEP_{re}$, the MS selects a path for receiving the service directly from the BS, and whereas, when throughput ($SEP_{dir}$) for a case when a service is received directly from the BS is less than throughput ($SEP_{re}$ or $CSEP_{re}$) for a case when a service is received via an RS, that is, ($SEP_{dir} < SEP_{re}$ or $SEP_{dir} < CSEP_{re}$), the MS selects a path for receiving the service via an RS.

Figure 5:
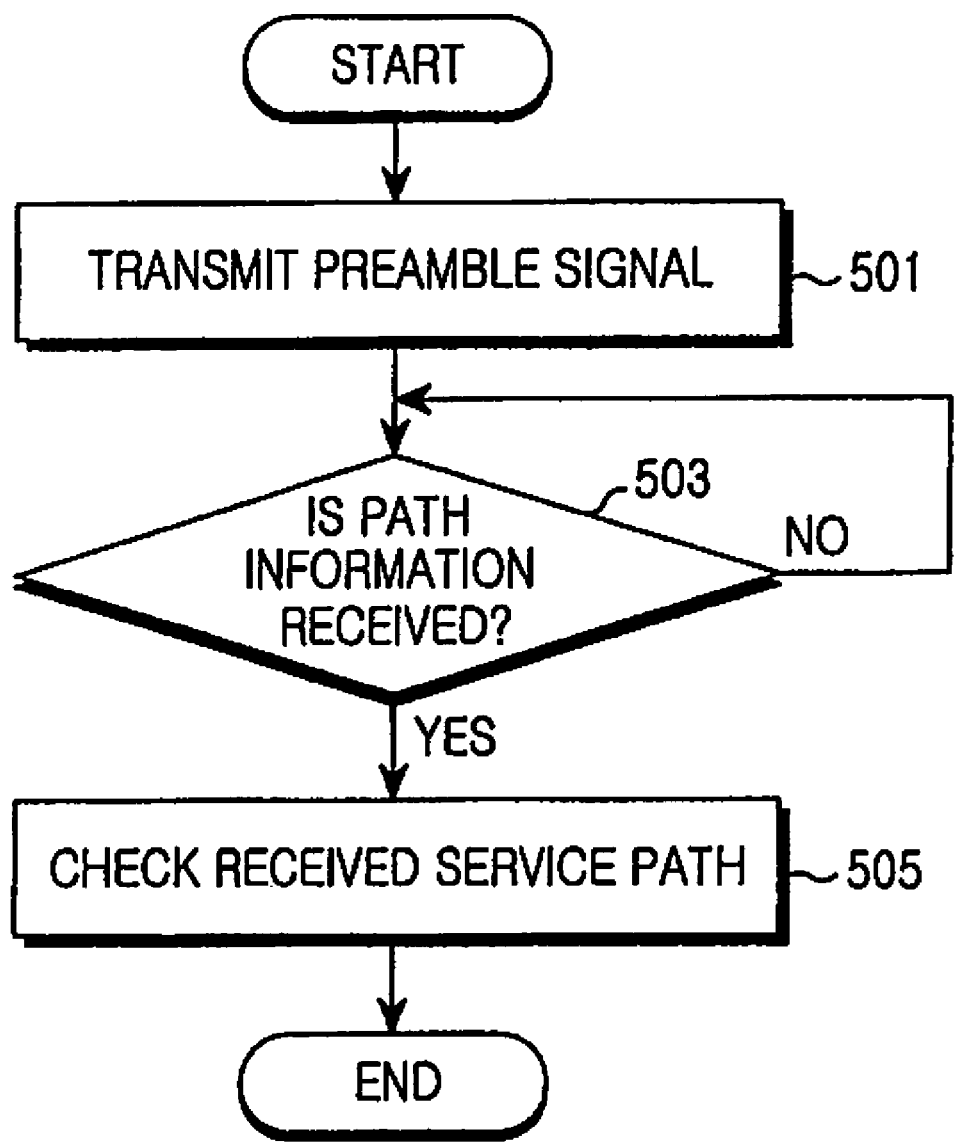
FIG. 5 is a flowchart illustrating an operation performed by a BS when an MS selects a service path in a relay communication system according to the present invention.

FIG. 5 shows an operation performed by a BS when an MS selects a service path in a relay communication system according to the present invention.

In FIG. 5, in step 501, the BS transmits a preamble (or pilot) signal to an MS and RSs existing within a cell within a time interval so that the MS and the RSs can measure a channel condition.

In step 503, the BS checks whether information on a service path to be used in communication is received from the MS. Upon receiving the service path information, in step 505, the BS checks whether communication is made directly from the MS or whether communication is made via a specific RS existing in the cell. The procedure of FIG. 5 is then ended.

Figure 6:
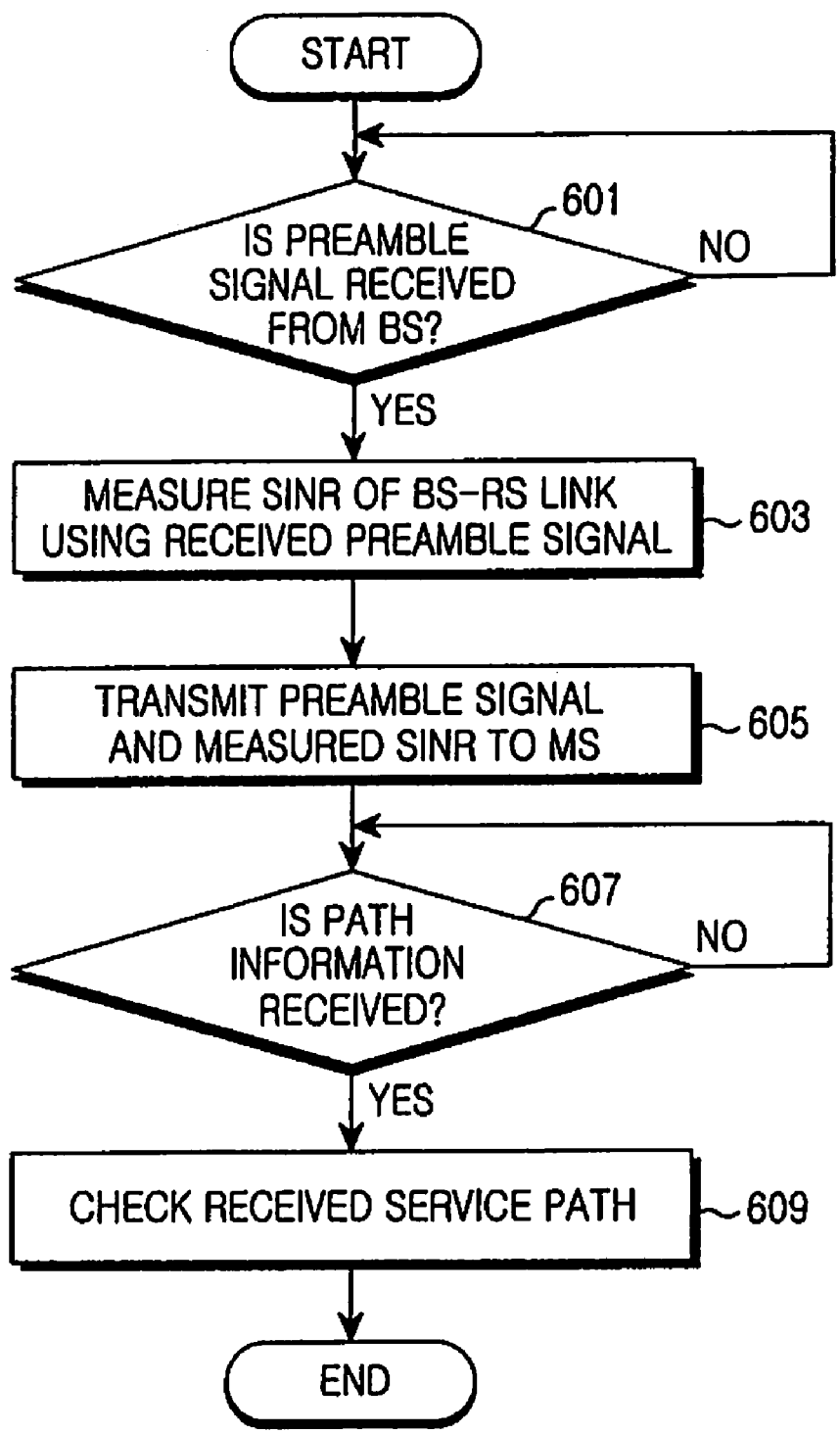
FIG. 6 is a flowchart illustrating an operation performed by an RS when an MS selects a service path in a relay communication system according to the present invention.

FIG. 6 shows an operation performed by an RS when an MS selects a service path in a relay communication system according to the present invention.

In FIG. 6, in step 601, the RS checks whether a preamble (or pilot) signal is received from a BS. Upon receiving the preamble (or pilot) signal, in step 603, the RS obtains channel information from the preamble (or pilot) signal, and measures an SINR of a BS-RS link.

In step 605, the RS transmits the preamble (or pilot) signal to the MS, together with the measured SINR of the BS-RS link. Instead of transmitting the measured SINR together with the preamble signal, the SINR and the preamble signal may be separately transmitted.

In step 607, the RS checks whether information on a service path is received from the MS. Upon receiving the service path information, in step 609, the RS checks whether communication is made by the MS via an RS. The procedure of FIG. 6 is then ended.

Figure 7:
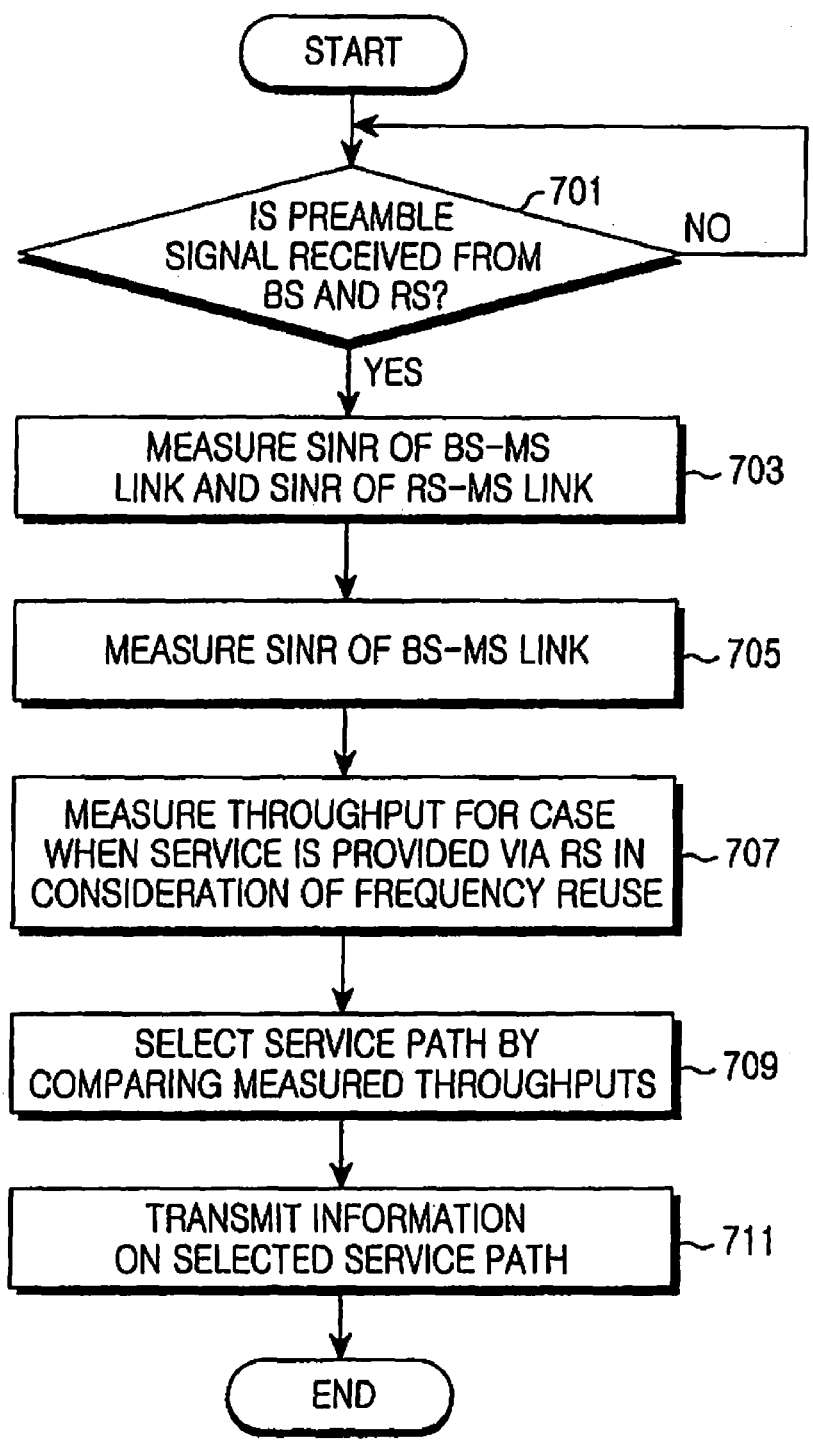
FIG. 7 is a flowchart illustrating an operation performed by an MS for selecting a service path in a relay communication system according to the present invention.

FIG. 7 shows an operation performed by an MS for selecting a service path in a relay communication system according to the present invention.

In FIG. 7, in step 701, the MS checks whether a preamble (or pilot) signal is received from a BS and an RS. Upon receiving the preamble (or pilot) signal, in step 703, the MS obtains channel information from the preamble (or pilot) signal received from the BS and the RS, and measures an SINR of a BS-MS link and an SINR of an RS-MS link. The SINR of the BS-RS link may be received while the preamble (or pilot) signal is being received from the RS.

After measuring the SINR of each link, in step 705, the MS computes throughput for a case when a service is received directly from the BS as expressed by Equation (1) above by using the measured SINR of the BS-MS link. Thereafter, in step 707, according to the measured SINR of the RS-MS link and the received SINR of the BS-RS link, the MS computes throughput for a case when the service is received via an RS, in consideration of frequency reuse within a cell as expressed by Equation (3) above. The throughput for a case when the service is received via an RS may be computed simply using the SINR as expressed by Equation (2) without taking the frequency reuse into account.

In step 709, the MS compares the measured throughputs of the respective service paths and selects a service path having a highest throughput. In step 711, the MS transmits information on the selected service path to the BS. When a specific RS is selected as the service path, the MS transmits to the selected RS a signal indicating the fact that the RS has been selected as the service path of the MS.

The procedure of FIG. 7 is then ended.

Figure 8:
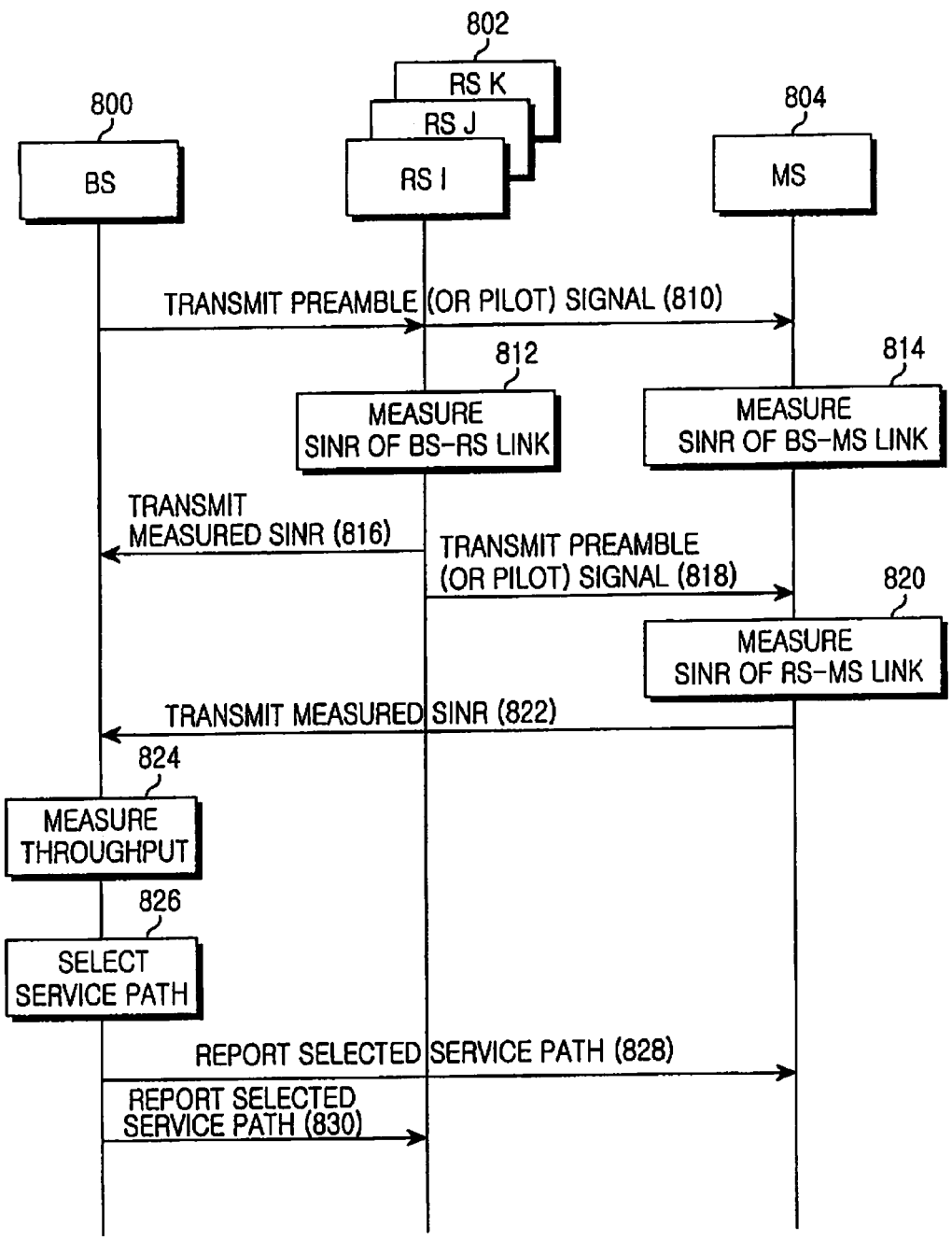
FIG. 8 illustrates a signal flow diagram when a BS selects a service path in a relay communication system according to the present invention.

FIG. 8 shows a signal flow diagram when a BS selects a service path in a relay communication system according to the present invention.

In FIG. 8, in step 810, in order for an MS 804 and a plurality of RSs 802 existing within a cell to be able to measure a channel condition, a BS 800 transmits to the MS 804 and the RSs 802 a preamble (or pilot) signal within an interval.

In step 812, the RSs 802 measures an SINR of a BS-RS link by using the preamble (or pilot) signal received from the BS 800. Then, in step 814, the MS 804 measures an SINR of a BS-MS link by using the preamble (or pilot) signal received from the BS 800.

In step 816, the RSs 802 transmits to the MS 804 the SINR of the BS-RS link. In step 818, the RSs 802 generates a preamble (or pilot) signal and transmits the signal to the MS 804.

In step 820, the MS 804 measures the SINR of the RS-MS link by using the preamble (or pilot) signal received from the RS 802. In step 822, the MS 804 transmits the measured SINR of each link to the BS 800.

In step 824, the BS 800 computes throughput depending on a service path of the MS 804 by using the received SINR of each link. In other words, throughput for a case when the BS 800 provides a service directly to the MS 804 and throughput for a case when the service is provided to the MS 804 via each RS 802 are computed. The throughput for a case when the service is provided via an RS 802 may be computed in consideration of frequency resources reused by the RSs existing within the cell.

In step 826, the BS 800 compares the computed throughputs of the respective service paths, and selects a service path having a highest throughput. In step 828, the BS 800 reports the selected service path to the MS 804. If a specific RS 802 is selected as the service path, in step 830, the BS 800 reports to selected RS 802 the fact that the RS 802 has been selected as the service path of the MS 804.

Figure 9:
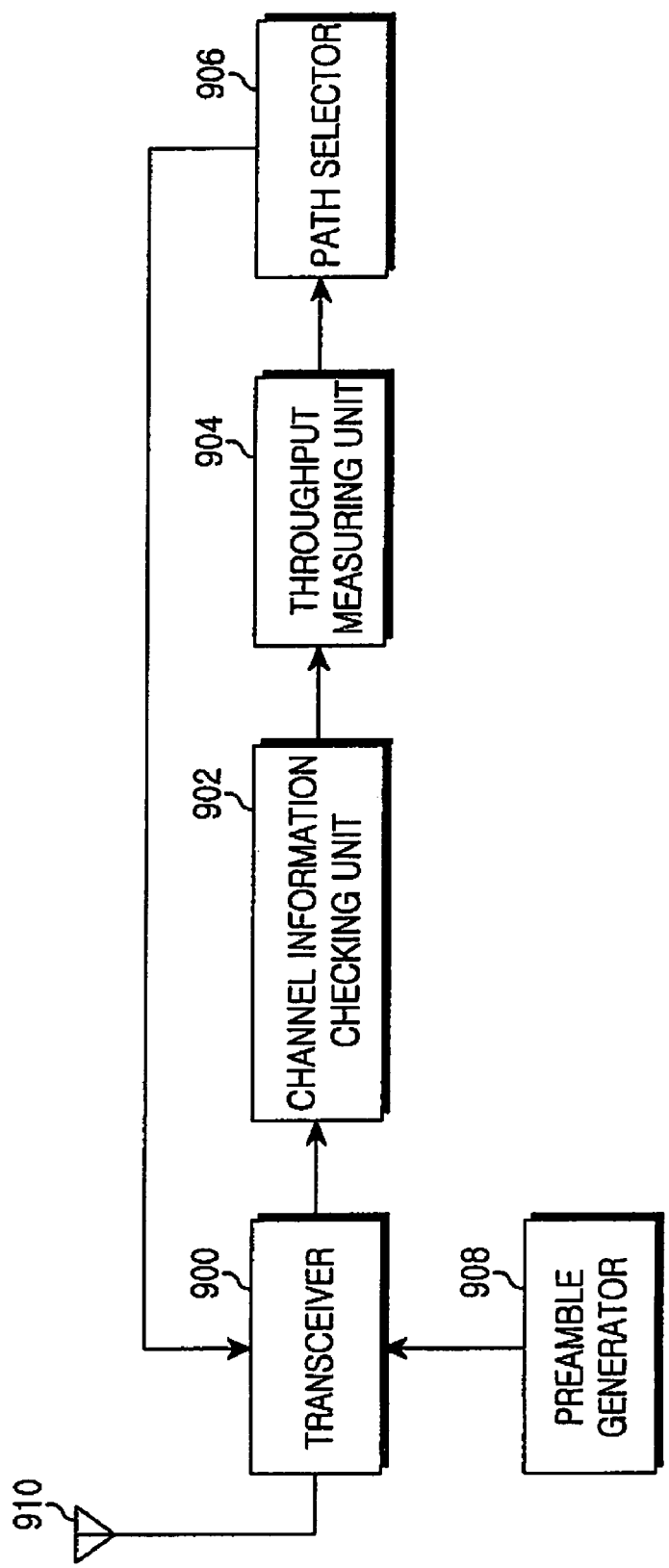
FIG. 9 is a block diagram of a BS selecting a service path in a relay communication system according to the present invention.

FIG. 9 shows a BS selecting a service path in a relay communication system according to the present invention. The BS includes a transceiver 900, a channel information checking unit 902, a throughput measuring unit 904, a path selector 906, a preamble generator 908, and an antenna 910.

Referring to FIG. 9, the transceiver 900 transmits and receives an RF signal through the antenna 910. In particular, the transceiver 900 transmits a preamble (or pilot) signal, input from the preamble generator 908, to the MS and RSs existing within a cell, and transmits to the channel information checking unit 902 channel information received from the MS and RSs, that is, an SINR of each link.

The channel information checking unit 902 checks an SINR of a BS-RS link, an SINR of a BS-MS, and an SINR of an RS-MS link, and then outputs the checking result to the throughput measuring unit 904.

The throughput measuring unit 904 receives the SINR of each link from the channel information checking unit 902, and computes throughput depending on a service path of the MS by using the received SINR of each link. In other words, the throughput measuring unit 904 computes throughput for a case when the BS provides a service directly to the MS as expressed by Equation (1) above, and computes throughput for a case when the service is provided to the MS via each RS as expressed by Equation (2) above.

As mentioned above, in FIG. 15, assuming that the number of RSs existing within a cell is N, and frequency resources are reused by the RSs, then, when throughput is computed for a case when a service is received via the RSs, the throughput measuring unit 904 may compute the throughput in consideration of the frequency reuse. In this case, in order to define a frequency reuse pattern used by the RSs, a frame is divided into a Frame Type 1 (FT1) in which a signal is transmitted by a BS and a Frame Type 2 (FT2) in which a signal is transmitted by an RS, and the BS is assumed to not transmit a signal in a case of the FT2. Accordingly, in the FT2, a frequency resource may be repeatedly used up to N/FRF times according to an FRF as shown in FIG. 16.

Therefore, the throughput measuring unit 904 may compute throughput depending on the frequency reuse, as expressed by Equation (3) above, in consideration of the fact that the same frequency resource is repeatedly used in the same frame according to the FRF used by the RSs. The throughput computed using the frequency reuse as expressed by Equation (3) above may be considered as an ideal computation result. The throughput may also be computed using a weighting factor, as expressed by Equation (4) above.

The path selector 906 compares the throughputs measured by the throughput measuring unit 904, selects a service path having a highest throughput, and outputs information on the selected service path to the transceiver 900. In other words, when throughput ($SEP_{dir}$) for a case when a service is received directly from the BS is greater than or equal to throughput ($SEP_{re}$ or $CSEP_{re}$) for a case when the service is received via an RS, that is, $SEP_{dir} \geq SEP_{re}$ or $SEP_{dir} \geq CSEP_{re}$, the path selector 906 selects the BS as the service path, and whereas, when throughput ($SEP_{dir}$) for a case when the service is received directly from the BS is less than throughput ($SEP_{re}$ or $CSEP_{re}$) for a case when the service is received via an RS, that is, ($SEP_{dir} < SEP_{re}$ or $SEP_{dir} < CSEP_{re}$), the path selector 906 selects the RS as the service path.

The preamble generator 908 generates a preamble (or pilot) signal within a particular time interval and outputs the signal to the transceiver 900.

Figure 10:
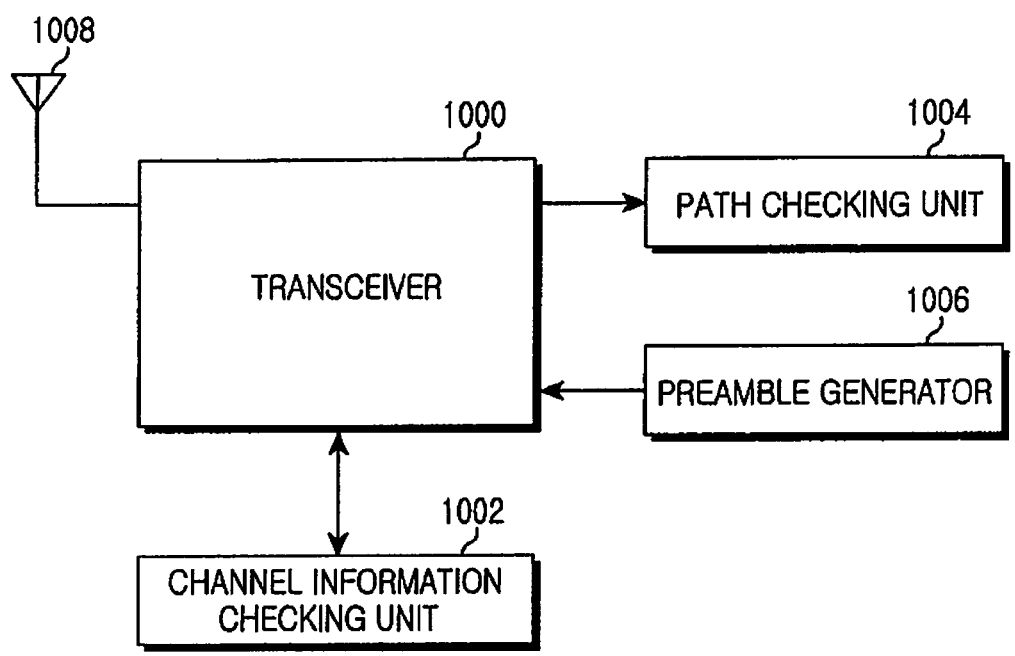
FIG. 10 is a block diagram of an RS when a BS selects a service path in a relay communication system according to the present invention.

FIG. 10 shows an RS when a BS selects a service path in a relay communication system according to the present invention. The RS includes a transceiver 1000, a channel information checking unit 1002, a path checking unit 1004, a preamble generator 1006, and an antenna 1008.

Referring to FIG. 10, the transceiver 1000 transmits and receives an RF signal through the antenna 1008. In particular, the transceiver 1000 transmits a preamble (or pilot) signal, input from the preamble generator 1006, to the MS and RSs existing within a cell, and transmits to the channel information checking unit 1002 channel information received from the BS. Further, the transceiver 1000 transmits to the BS channel information (i.e., an SINR of a BS-RS link) received from the channel information checking unit 1002, and outputs to the path checking unit 1004 service path information received from the RS.

The channel information checking unit 1002 obtains channel information regarding the RS by using the received preamble (or pilot) signal, measures the SINR of the BS-RS link, and outputs the measured SINR to the transceiver 1000.

The path checking unit 1004 checks whether the RS is selected as the service path of the MS by using service information received from the transceiver 1000, and performs a function for communication with the MS.

The preamble generator 1006 generates a preamble (or pilot) signal within a particular time interval, and outputs the signal to the transceiver 1000.

Figure 11:
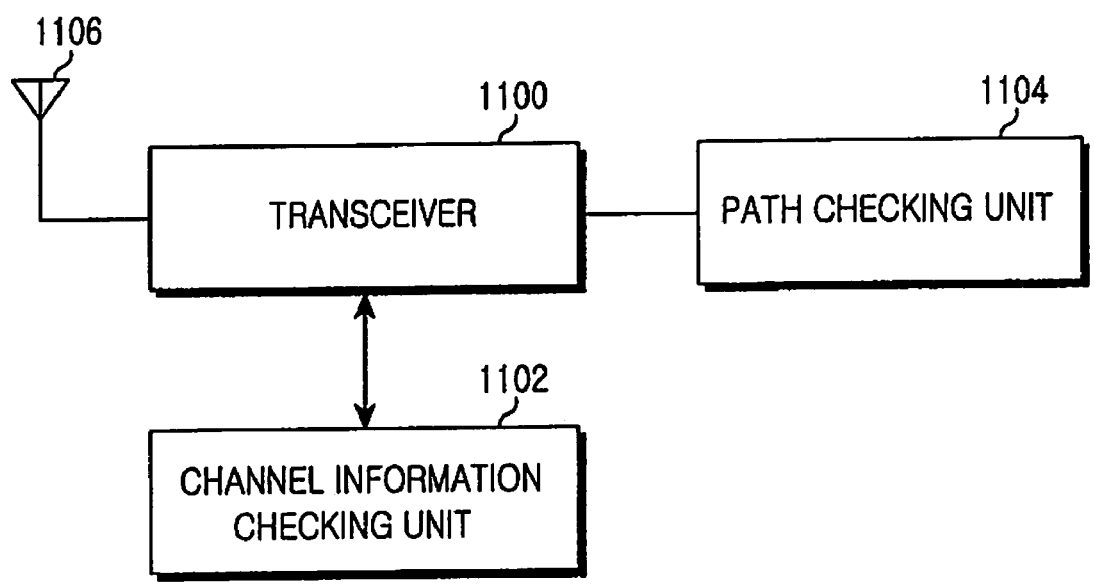
FIG. 11 is a block diagram of an MS when a BS selects a service path in a relay communication system according to the present invention.

FIG. 11 shows an MS when a BS selects a service path in a relay communication system according to the present invention. The MS includes a transceiver 1100, a channel information checking unit 1102, a path checking unit 1104, and an antenna 1106.

Referring to FIG. 11, the transceiver 1100 transmits and receives an RF signal through the antenna 1106. In particular, the transceiver 1100 outputs to the channel information checking unit 1102 a preamble (or pilot) signal received from a BS and RSs, and outputs to the path checking unit 1104 service path information received from the BS.

The channel information checking unit 1102 obtains channel information regarding the BS and channel information regarding each RS existing within a cell by using the received preamble (or pilot) signal, measures an SINR of a BS-MS link and an SINR of an RS-MS link, and outputs the measured SINRs to the transceiver 1100.

The path checking unit 1104 receives information on a service path of the MS from the transceiver 1100, and performs a communication function by using the service path.

Figure 12:
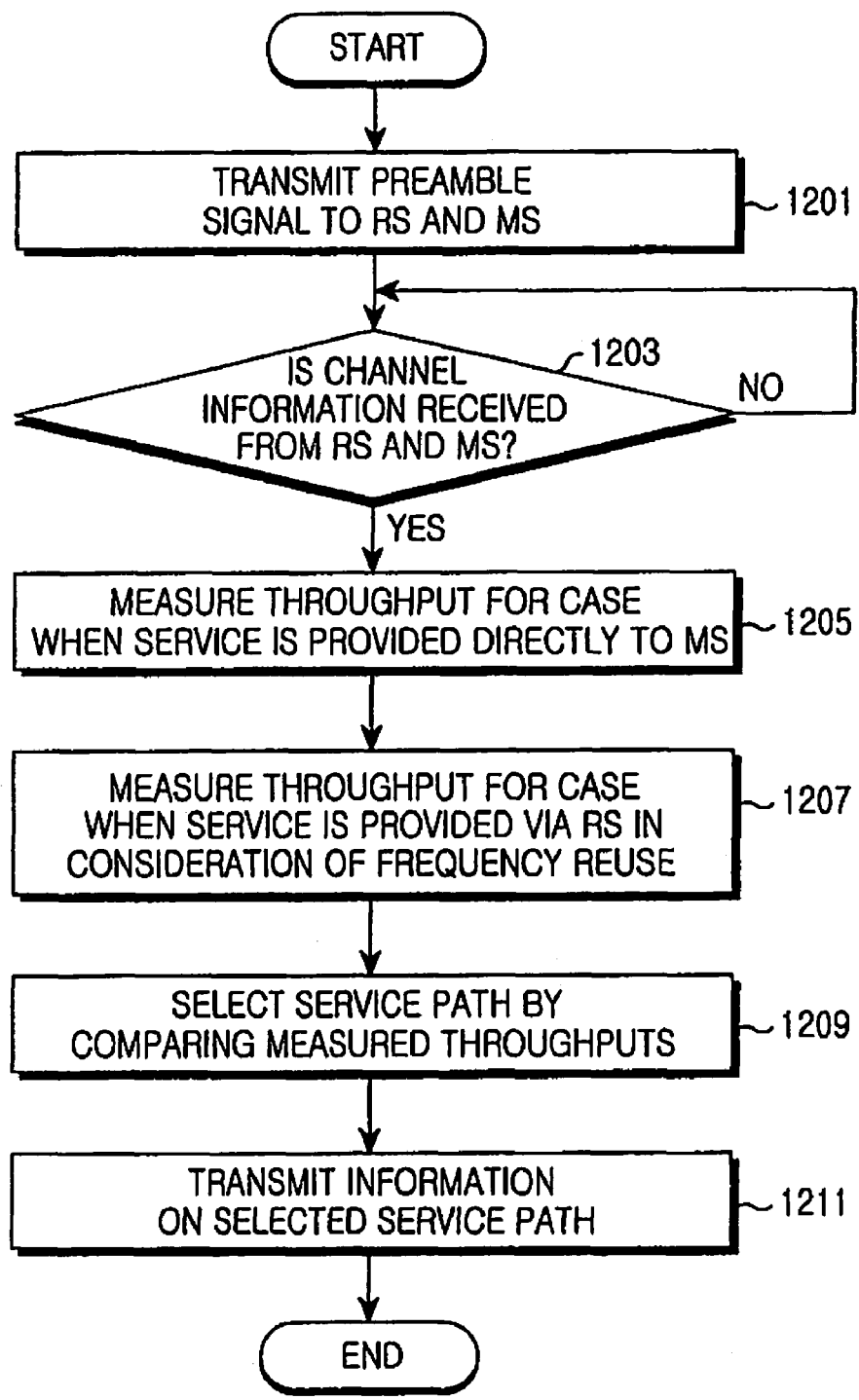
FIG. 12 is flowchart illustrating an operation performed by a BS for selecting a service in a relay communication system according to the present invention.

FIG. 12 shows an operation performed by a BS for selecting a service in a relay communication system according to the present invention.

In FIG. 12, in step 1201, the BS transmits a preamble (or pilot) signal to an MS and RSs existing within a cell within a particular time interval so that the MS and RSs can measure a channel condition.

In step 1203, the BS checks whether channel information (i.e., SINR) of each link is received from the MS and the RSs. Upon receiving the SINR of each link, in step 1205, by using the SINR of the BS-MS link, the BS computes throughput for a case when the BS provides a service to the MS, as expressed by Equation (1) above. Thereafter, in step 1207, according to an SINR of the RS-MS link, the BS computes throughput for a case when the service is provided to the MS via each RS in consideration of frequency reuse within a cell, as expressed by Equation (3) above. The throughput for a case when the service is received via an RS may be computed simply using the SINR, as expressed by Equation (2) without taking the frequency reuse into account.

In step 1209, the BS compares the measured throughputs of the respective service path and selects a service path having a highest throughput. In step 711, the BS transmits information on the selected service path to the MS. When a specific RS is selected as the service path, the BS transmits to the selected RS a signal indicating the fact that the RS has been selected as the service path of the MS. The procedure is then ended.

Figure 13:
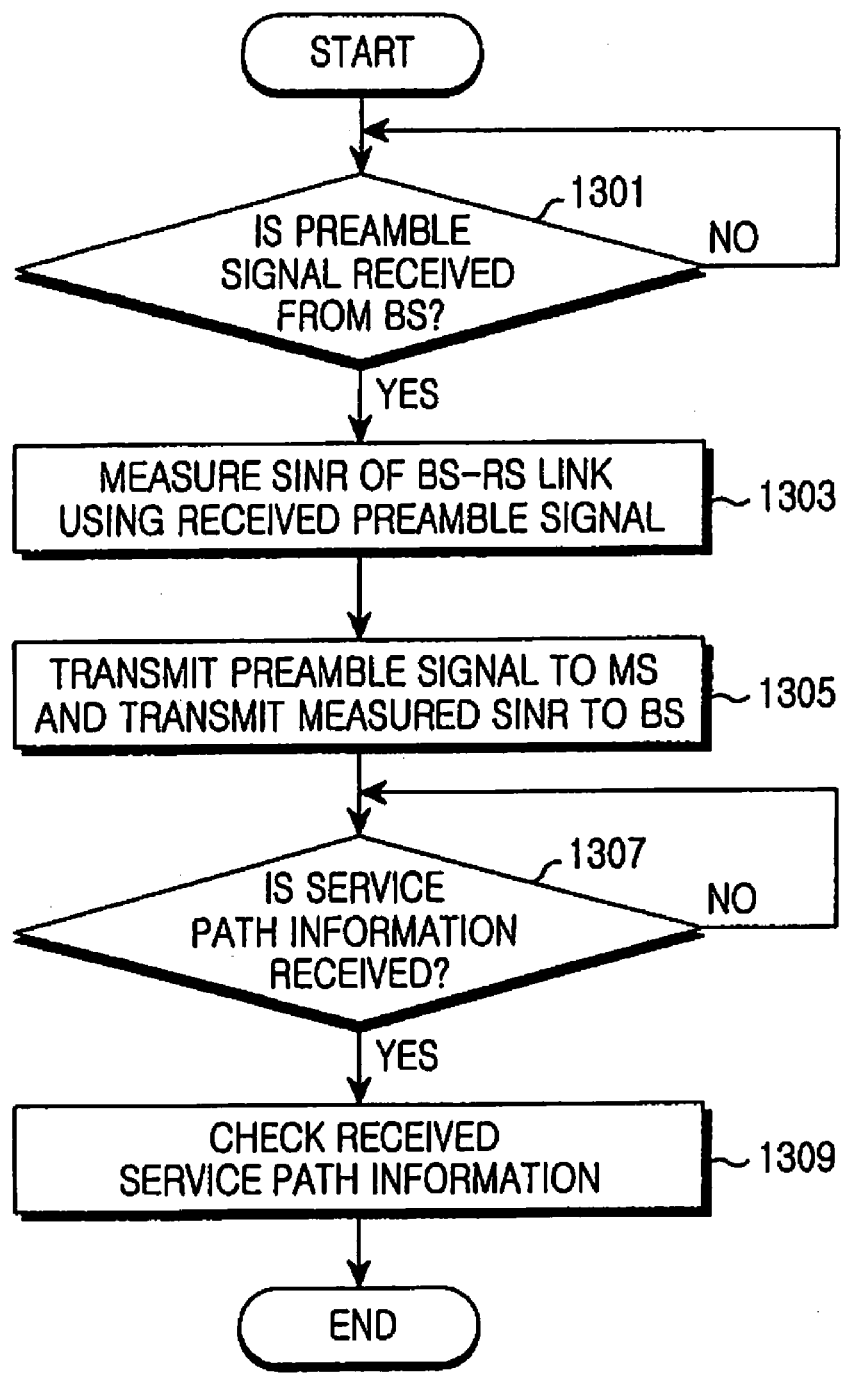
FIG. 13 is a flowchart illustrating an operation performed by an RS when a BS selects a service path in a relay communication system according to the present invention.

FIG. 13 shows an operation performed by an RS when a BS selects a service path in a relay communication system according to the present invention.

In FIG. 13, in step 1301, the RS checks whether a preamble (or pilot) signal is received from the BS. Upon receiving the preamble (or pilot) signal, in step 1303, the RS obtains channel information from the received preamble (or pilot) signal, and measures an SINR of a BS-RS link.

In step 1305, the RS transmits the preamble (or pilot) signal to the MS, and transmits the measured SINR of the BS-RS link to the BS.

In step 1307, the RS checks whether information on a service path is received from the BS. Upon receiving the information on the service path, in step 1309, the RS checks whether communication is made by the MS via an RS. The procedure is then ended.

Figure 14:
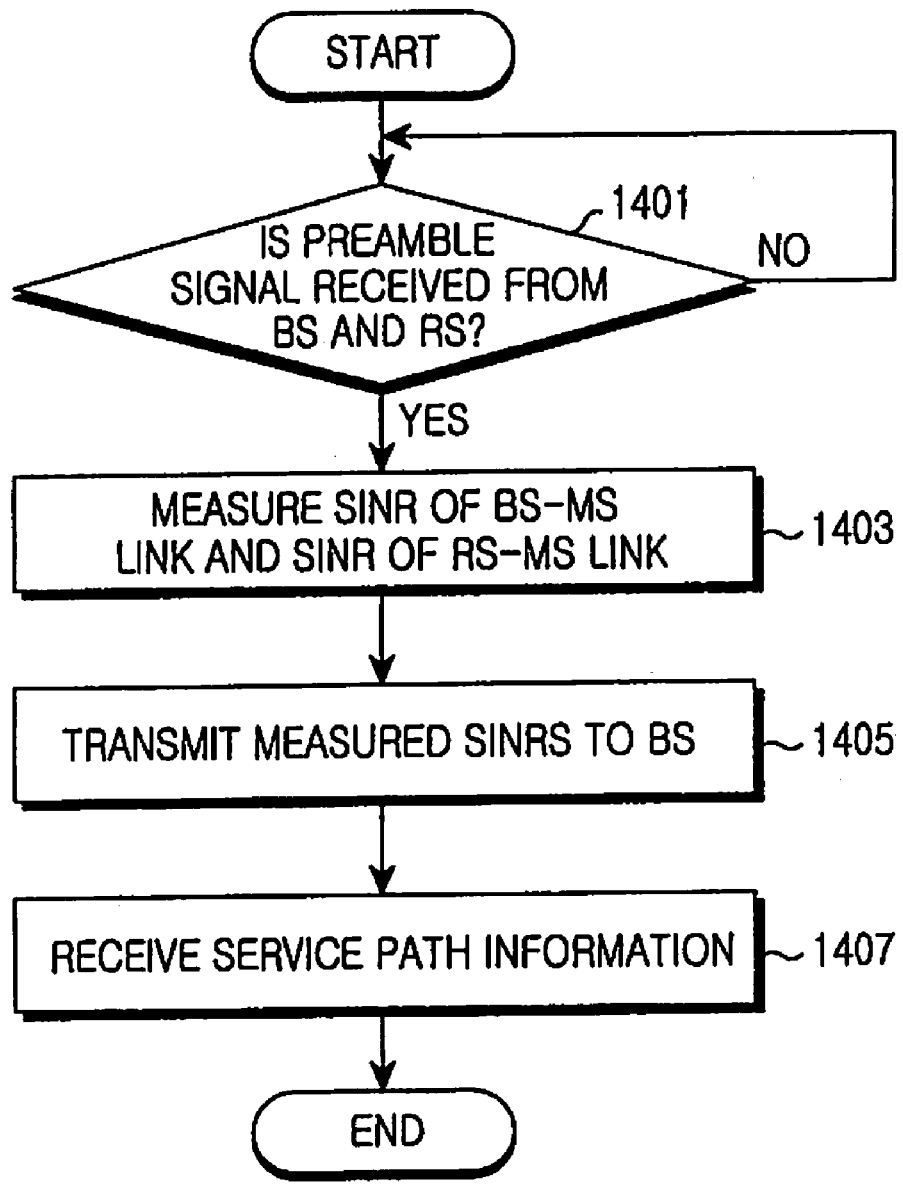
FIG. 14 is a flowchart illustrating an operation performed by an MS when a BS selects a service path in a relay communication system according to the present invention.

FIG. 14 shows an operation performed by an MS when a BS selects a service path in a relay communication system according to the present invention.

In FIG. 14, in step 1401, the MS checks whether a preamble (or pilot) signal is received from the BS and RSs. Upon receiving the preamble (or pilot), in step 1403, the MS obtains channel information from the preamble (or pilot) signal received from the BS and the RSs, and measures an SINR of a BS-MS link and an SINR of an RS-MS link.

In step 1405, the measured SINR of each link is transmitted to the BS. In step 1407, information on the service path of the MS is received from the BS. The procedure is then ended.

Figure 17A:
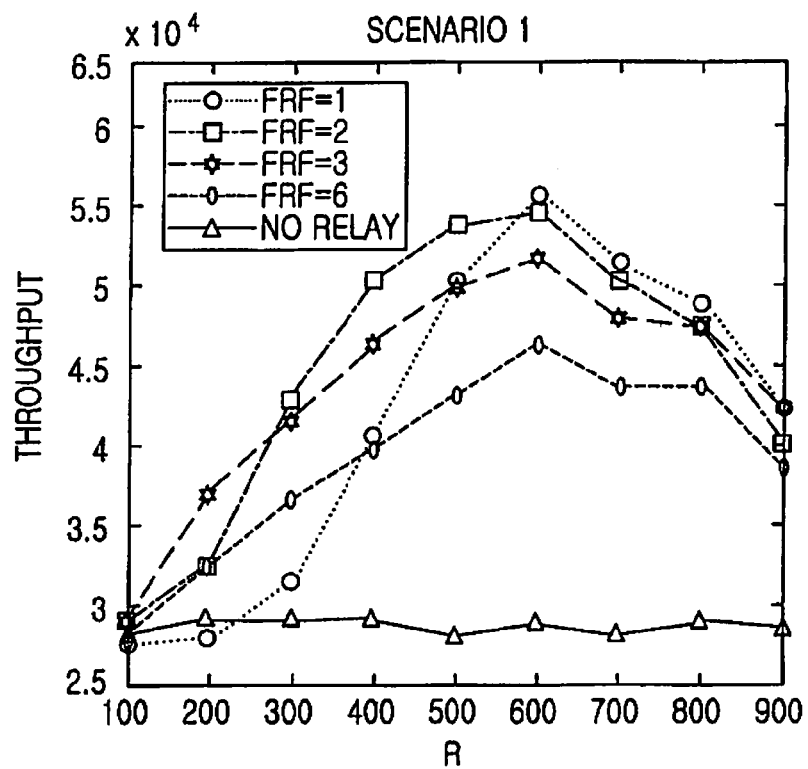
FIGS. 17A and 17B show graphs each illustrating a throughput measurement result when frequency resources are reused in a relay communication system according to the present invention.
Figure 17B:
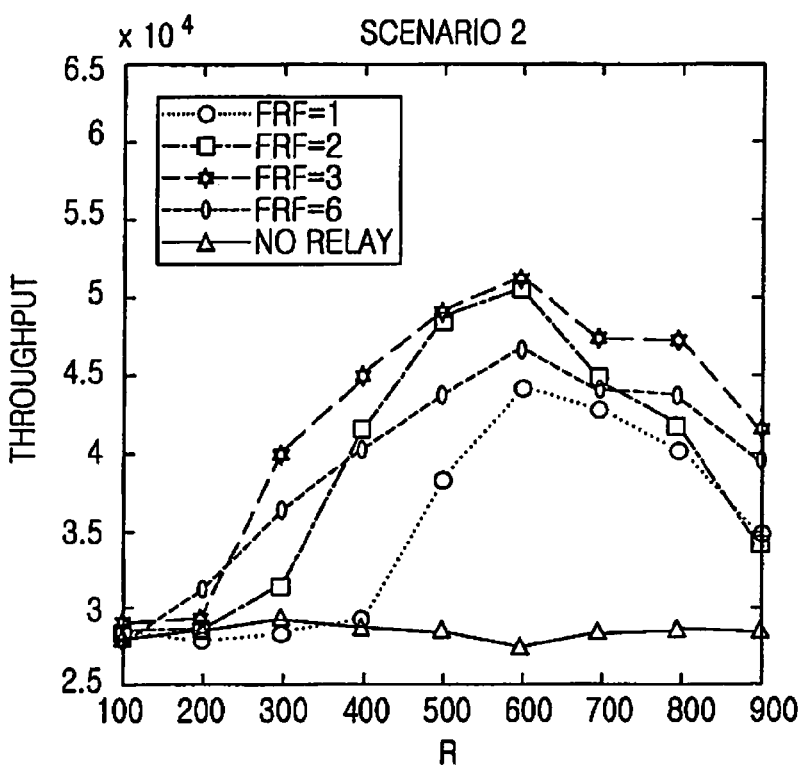

FIGS. 17A and 17B show graphs each illustrating a throughput measurement result when frequency resources are reused in a relay communication system according to the present invention. In each graph, the horizontal axis represents the distance between a BS and an RS, the vertical axis represents a throughput value. In the following descriptions, six RSs are presumed to be present in a cellular network environment and each of which are in association with one MS capable of transmitting data.

Referring to FIG. 17A, throughput is measured in consideration of an SINR of a BS-RS link and an SINR of an MS-MS link, wherein the graph of FIG. 17A shows throughput for a case when a service path is selected according to the measured throughput. FIG. 17B is a graph showing throughput for a case when the service path is selected by measuring throughput in consideration of the SINR of each link and frequency resource reused within a cell.

As shown in FIGS. 17A and 17B, throughput of the cell increases when the service path is selected in consideration of the reuse of frequency resource than when the service path is selected in consideration of only the SINR without consideration of the reuse of the frequency resource. The higher the throughput, the more frequently the frequency resource is reused.

Although it has been described that a service path to be used in the communication of anMS is determined by a BS and the MS itself, the service path of the MS may be determined by an RS. When the service path of the MS is determined by the RS, the MS has to transmit an SINR of the BS-MS link and an SINR of the RS-MS link to the RS, and the RS has to exchange the SINR or a throughput value to RSs existing within a cell.

According to the present invention, in a relay communication system, whether to receive a service directly from a BS to an MS or whether to receive a service via an RS can be determined by computing throughput depending on frequency reuse within a cell. Therefore, there is an advantage in that throughput of the cell generally increases.

While the present invention has been particularly shown and described with reference to preferred embodiments thereof, it will be understood by those skilled in the art that various changes in form and details may be made therein without departing from the spirit and scope of the present invention as defined by the appended claims.

What is claimed is:

1. A method of operating a Mobile Station (MS) for selecting a service path in a relay communication system, the method comprising:

measuring a Signal-to-Interference and Noise Ratio (SINR) of each link by using preamble (or pilot) signals from a Base Station (BS) and Relay Stations (RSs);

computing throughput for a case when a service is received from the BS by using the measured SINR of each link;

computing throughput for a case when the service is received via each RS in consideration of the measured SINR of each link and frequency resources reused in the RSs existing within a cell; and selecting a service path having a highest throughput by comparing the computed throughputs of the respective service paths.

2. The method of claim 1, further comprising reporting to the BS or RS that the BS or RS has been selected as the service path of the MS.

3. The method of claim 1, wherein the step of measuring the SINR of each link comprises:

measuring an SINR of a BS-MS link by using a first preamble (or pilot) signal received from the BS;

measuring an SINR of an RS-MS link by using a second preamble (or pilot) signal received from each RS; and receiving an SINR of a BS-RS link from each RS.

4. The method of claim 1, wherein, when the service is provided from the BS, the throughput, $SEP_{thr}$, where SEP is Spectral Efficiency Path, can be expressed as:

$$SEP_{dir}=C(SINR_{BM}),$$

where C denotes an SINR function for channel throughput, and $SINR_{BM}$ denotes an SINR value of a BS-MS link.

5. The method of claim 1, wherein, when the service is provided via an RS in consideration of the frequency reuse, the throughput, $CSEP_{re}$, where CSEP is Cell Spectral Efficiency Path, of the service path is expressed as:

$$CSEP_{re} = \left(\frac{1}{C_{BR}} + \frac{FRF}{nC_{MR}}\right)^{-1},$$

where $C_{BR}$ denotes throughput of a BS-RS link, $C_{MR}$ denotes throughput of an MS-RS link, n denotes the number of RSs each associated with a different MS within the cell, and FRF denotes a frequency reuse factor.

6. The method of claim 5, wherein a same frequency resource is repeatedly used up to N/FRF times in a same frame according to the FRF.

7. The method of claim 1, wherein, when the service is provided via the RS in consideration of frequency reuse, the throughput, $CSEP_{re}$, where CSEP is Cell Spectral Efficiency Path, of the service path is expressed as:

$$CSEP_{re} = \left(\frac{1}{C_{BR}} + \frac{FRF}{\alpha n C_{MR}}\right)^{-1},$$

where $C_{BR}$ denotes throughput of a BS-RS link, $C_{MR}$ denotes throughput of an MS-RS link, a denotes a weighting factor where $0 \leq \alpha \leq 1$ m, n denotes the number of RSs each associated with a different MS within the cell, and FRF denotes a frequency reuse factor.

8. The method of claim 1, wherein the BS and the RS each transmit a signal in a different frame.

9. A Mobile Station (MS) apparatus for selecting a service path in a relay communication system, the MS apparatus comprising:

a transceiver for transmitting/receiving signals to/from a Base Station (BS) and Relay Stations (RSs);

a channel information checking unit for measuring a Signal-to-Interference and Noise Ratio (SINR) of each link by using the signals received from the BS and the RSs;

a throughput measuring unit for computing throughput for a case when a service is received from the BS by using the measured SINR of each link and throughput for a case when the service is received via each RS in consideration of frequency reuse within a cell; and a path selector for selecting a service path having a highest throughput by comparing the computed throughputs of the service paths.

10. The apparatus of claim 9, wherein the SINR of each link includes an SINR of a BS-RS link, an SINR of a BS-MS link, and an SINR of an RS-MS link.

11. The apparatus of claim 9, wherein, when the service is provided from the BS, the throughput, $SEP_{dir}$, where SEP is Spectral Efficiency Path, can be expressed as:

$$SEP_{dir}=C(SINR_{BM}),$$

where C denotes an SINR function for channel throughput, and $SINR_{BM}$ denotes an SINR value of a BS-MS link.

12. The apparatus of claim 9, wherein, when the service is provided via an RS in consideration of the frequency reuse, the throughput, $CSEP_{re}$, where CSEP is Cell Spectral Efficiency Path, of the service path is expressed as:

$$CSEP_{re} = \left(\frac{1}{C_{BR}} + \frac{FRF}{nC_{MR}}\right)^{-1},$$

where $C_{BR}$ denotes throughput of a BS-RS link, $C_{MR}$ denotes throughput of an MS-RS link, n denotes the number of RSs each associated with a different MS within the cell, and FRF denotes a frequency reuse factor.

13. The apparatus of claim 12, wherein a same frequency resource is repeatedly used up to N/FRF times in a same frame according to the FRF.

14. The apparatus of claim 9, wherein the transceiver reports to the BS or RS that the BS or RS has been selected as the service path of the MS.

15. The apparatus of claim 9, wherein, when the service is provided via the RS in consideration of frequency reuse, the throughput, CSEPre, where CSEP is Cell Spectral Efficiency Path, of the service path is expressed as:

$$CSEP_{re} = \left(\frac{1}{C_{BR}} + \frac{FRF}{\alpha n C_{MR}}\right)^{-1},$$

where $C_{BR}$ denotes throughput of a BS-RS link, $C_{MR}$ denotes throughput of an MS-RS link, α denotes a weighting factor where $0 \leq a \leq 1$ m, n denotes the number of RSs each associated with a different MS within the cell, and FRF denotes a frequency reuse factor.

16. The apparatus of claim 9, wherein the BS and the RS each transmit a signal in a different frame.

* * * * *